(12) United States Patent
Weber et al.

(10) Patent No.: US 11,700,271 B2
(45) Date of Patent: Jul. 11, 2023

(54) DEVICE AND METHOD FOR ANOMALY DETECTION IN A COMMUNICATIONS NETWORK

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Düsseldorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 318 days.

(21) Appl. No.: 16/921,126

(22) Filed: Jul. 6, 2020

(65) Prior Publication Data
US 2021/0014254 A1 Jan. 14, 2021

(30) Foreign Application Priority Data
Jul. 10, 2019 (DE) .......................... 102019210227.1

(51) Int. Cl.
*H04L 29/06* (2006.01)
*H04L 9/40* (2022.01)

(52) U.S. Cl.
CPC ...... *H04L 63/1425* (2013.01); *H04L 63/0236* (2013.01); *H04L 63/145* (2013.01); *H04L 63/1416* (2013.01); *H04L 63/20* (2013.01)

(58) Field of Classification Search
CPC ............. H04L 63/1425; H04L 63/0236; H04L 63/1416; H04L 63/145; H04L 63/20; H04L 63/0209; H04L 67/12; H04W 4/40
See application file for complete search history.

(56) References Cited

U.S. PATENT DOCUMENTS

| | | | | |
|---|---|---|---|---|
| 7,672,814 | B1* | 3/2010 | Raanan | H04L 41/5058 702/182 |
| 8,085,681 | B2* | 12/2011 | Raftelis | H04L 63/1441 370/252 |
| 9,081,653 | B2* | 7/2015 | Ricci | G06F 11/2023 |
| 9,106,687 | B1* | 8/2015 | Sawhney | H04L 12/185 |

(Continued)

FOREIGN PATENT DOCUMENTS

CN 104380349 A * 2/2015 ............... B60Q 1/00

OTHER PUBLICATIONS

Muter et al., "Entropy-Based Anomaly Detection for In-Vehicle Networks", 2011 IEEE Intelligent Vehicles Symposium, pp. 1110-1115 (Year: 2011).*

(Continued)

*Primary Examiner* — John B King
(74) *Attorney, Agent, or Firm* — Norton Rose Fulbright US LLP; Gerard Messina

(57) ABSTRACT

A device and a method for anomaly detection in a communications network, at least two messages at a port of the communications network being observed, a property of a communication behavior of a network user being determined as a function of the at least two messages, a deviation of the property from an expected property being determined, and the presence of an anomaly being detected when the deviation differs from an allowable deviation. The expected property defines a communication behavior of the at least one network user as a function of an in particular static network architecture of the communications network.

14 Claims, 2 Drawing Sheets

(56) References Cited

U.S. PATENT DOCUMENTS

| | | | |
|---|---|---|---|
| 9,521,973 B1* | 12/2016 | Beiski | A61B 5/168 |
| 10,239,456 B1* | 3/2019 | Tao | B60R 1/00 |
| 11,044,533 B1* | 6/2021 | Li | H04L 41/064 |
| 2003/0167402 A1* | 9/2003 | Stolfo | H04L 51/212 |
| | | | 726/23 |
| 2006/0107321 A1* | 5/2006 | Tzadikario | H04L 63/1425 |
| | | | 726/22 |
| 2007/0245420 A1* | 10/2007 | Yong | H04L 63/1425 |
| | | | 726/23 |
| 2008/0028467 A1* | 1/2008 | Kommareddy | H04L 63/1458 |
| | | | 726/23 |
| 2008/0167781 A1* | 7/2008 | Labuhn | B60W 30/08 |
| | | | 701/70 |
| 2010/0154057 A1* | 6/2010 | Ko | H04L 65/1104 |
| | | | 726/13 |
| 2011/0269441 A1* | 11/2011 | Silver | H04W 4/027 |
| | | | 455/418 |
| 2013/0097709 A1* | 4/2013 | Basavapatna | H04L 63/20 |
| | | | 726/25 |
| 2013/0211737 A1* | 8/2013 | Batcheller | G01M 7/00 |
| | | | 701/32.7 |
| 2015/0281277 A1* | 10/2015 | May | H04L 63/10 |
| | | | 726/1 |
| 2015/0381646 A1* | 12/2015 | Lin | H04L 63/1425 |
| | | | 726/23 |
| 2016/0381068 A1* | 12/2016 | Galula | G07C 5/0816 |
| | | | 726/23 |
| 2017/0126718 A1* | 5/2017 | Baradaran | H04L 63/0281 |
| 2018/0351981 A1* | 12/2018 | Muddu | H04L 63/1425 |
| 2019/0045207 A1* | 2/2019 | Chen | G06K 9/6215 |
| 2019/0182278 A1* | 6/2019 | Das | H04L 63/1425 |
| 2019/0195525 A1* | 6/2019 | Varghese | G05B 15/02 |
| 2019/0259033 A1* | 8/2019 | Reddy | G06N 5/02 |
| 2020/0145455 A1* | 5/2020 | Nandi | G06F 21/577 |
| 2020/0312118 A1* | 10/2020 | Compton | G08B 31/00 |
| 2020/0336503 A1* | 10/2020 | Xu | H04L 63/1425 |
| 2020/0351285 A1* | 11/2020 | Eisenkot | H04L 63/1441 |
| 2020/0406910 A1* | 12/2020 | Ruan | H04L 43/0829 |
| 2021/0258652 A1* | 8/2021 | Li | H04L 41/0686 |
| 2022/0207020 A1* | 6/2022 | Saurabh | G06F 16/24568 |

OTHER PUBLICATIONS

M. Müter and N. Asaj, "Entropy-based anomaly detection for in-vehicle networks," 2011 IEEE Intelligent Vehicles Symposium (IV), Baden-Baden, Germany, 2011, pp. 1110-1115, doi: 10.1109/IVS.2011.5940552. (Year: 2011).*

* cited by examiner

DEVICE AND METHOD FOR ANOMALY DETECTION IN A COMMUNICATIONS NETWORK

CROSS REFERENCE

The present application claims the benefit under 35 U.S.C. § 119 of German Patent Application No. DE 102019210227.1 filed on Jul. 10, 2019, which is expressly incorporated herein by reference in its entirety.

FIELD

The present invention is directed to a device and a method for anomaly detection in a communications network, in particular in a vehicle.

BACKGROUND INFORMATION

Network Intrusion Detection and Prevention Systems (NIDPSs) are used to detect anomalies, and to respond to detected anomalies if necessary. This increases the operational reliability of communications networks in particular with regard to intrusion scenarios.

It is desirable to further increase the operational reliability of a communications network, in particular of a vehicle.

SUMMARY

This may be achieved by an example device and an example method in accordance with the present invention.

To provide an NIDPS for an automotive network, differences between automotive networks and enterprise networks must be taken into account. These are, for example, the network structure, the network dynamics, and the network nodes of the networks.

Network Structure:

An enterprise network typically follows a client server model in which there are a fairly small number of dedicated server network nodes that provide services to a typically larger number of client network nodes. Automotive networks are made up of ECUs, on which server applications as well as client applications are carried out.

Enterprise networks are generally much larger and more complex than automotive networks. The entirety of an enterprise network is typically much more segmented, being physically or logically separated into various zones and subnetworks. ECUs in typical automotive networks are separated, if at all, by so-called "gateways" into only a very small number of subnetworks, or are logically separated at the Ethernet level via so-called "Virtual Local Area Networks" (VLANs).

Network Dynamics:

Enterprise networks and automotive networks differ in the dynamics with which the network is changed and operated.

Network nodes may be arbitrarily exchanged in enterprise networks. For changes in server network nodes, it is typically still possible to make an adaptation in the configuration of the defense systems such as the NIDPS. In contrast, such adaptations for network nodes that are clients are not possible. This is due to the fact that clients connect to the network from changing locations, and are frequently replaced. In addition, it cannot be accurately predicted which applications are carried out on a client.

ECUs in automotive networks are exchanged very rarely, if at all, and then are often replaced only by an identical copy. It is therefore very unlikely that there is any change in the functional performance of the network. The network nodes are well known in an automotive network. Likewise, the server and client applications that run on the automotive network are well-defined, and details concerning the network communication may be predefined.

In enterprise networks, nodes from outside connections may be incorporated into a corporate network. In an automotive network, all communication nodes of the network are part of the internal vehicle network.

In enterprise networks it is typically possible for various users to use the same client. In ECUs of automotive networks there are no users, only server and client applications that perform their service.

Network Node:

With regard to the resources, the network nodes of an enterprise network are generally much more resource-intensive with regard to memory and performance, for example, than ECUs of an automotive network.

With regard to the software, in enterprise networks the network nodes are usually equipped with widely used standard operating systems and standard software, for which security vulnerabilities are known. For this reason, NIDPS systems in enterprise networks are focused on signature-based detection when an attempt is made to exploit known security vulnerabilities. The network nodes in automotive networks are often equipped with less widely used software. A majority of the signatures from NIDPS systems for enterprise networks are not applicable, and there are no fairly large databases concerning vulnerabilities that are known specifically for automotive networks.

The basic task of an NIDPS, i.e., detection and response to anomalies in the network traffic, is the same for enterprise networks and automotive networks. However, the basic operating principle of an efficient NIDPS for automotive networks should be fundamentally different from that of an NIDPS for enterprise networks. An NIDPS for an automotive network should make use of the known, static network structure as well as the considerably lower dynamics of the network users to be able to efficiently detect anomalies with limited resources.

In accordance with an example embodiment of the present invention, a method for anomaly detection in a communications network provides that at least two messages at a port of the communications network are observed, a property of a communication behavior of a network user being determined as a function of the at least two messages, a deviation of the property from an expected property being determined, and the presence of an anomaly being detected when the deviation differs from an allowable deviation, the expected property defining a communication behavior of the at least one network user as a function of an in particular static network architecture of the communications network. In this way, in an automotive Ethernet network the network traffic at an existing Ethernet port is analyzed, and an anomaly caused by an intruder in the network is identified. This could be implemented, for example, at an automotive Ethernet switch, at the hardware ports, i.e., switch ports, thereof, or at hardware ports of an arbitrary user on the automotive Ethernet network in a vehicle. The anomaly detection is based, for example, on an analysis of at least two Ethernet packets and the resulting derivation of the communication behavior of a network user. If the observed communication behavior of a network user differs too greatly from the expected communication behavior, an anomaly is thus detected. Automotive Ethernet technology, for example according to 100BASE-T1 Version 1.0, 1000BASE-T1, or 100BASE-TX, is referred to.

The expected property is preferably determined based on a model that models a communication behavior of network users. The model models the communication behavior. In a vehicle, the model is defined as a function of knowledge about the vehicle.

A measure for the severity of the anomaly is preferably determined as a function of the property of the communication behavior of the at least one network user, of the expected property, and/or of the deviation, a response being determined as a function of the severity of the anomaly. It is thus possible to determine a response particularly well as a function of the result of the anomaly detection.

It is particularly advantageous when the response is selected from a plurality of defined responses as a function of the severity of the anomaly. For the vehicle, responses are defined, for example, as a function of knowledge about the vehicle. Of these responses, the response that is best suited for the particular severity of the anomaly is selected and implemented. This significantly improves the operational reliability of the vehicle.

It is preferably provided that the response includes a report to a central unit, discarding of a data packet in particular of one of the messages, and/or a transition of the communications network into a secure state. An appropriate response is thus triggered.

The model is preferably defined as a function of information concerning a static portion of the communications network, in particular a static network architecture preferably of a vehicle, the expected property being defined as a function of information concerning the static portion of the communications network, in particular the static network architecture.

It is preferably provided that the expected property defines a ratio between a first data volume and a second data volume, in particular data that are exchanged in a defined time period, first data packets or messages whose sender is a first network user and whose receiver is a second network user defining the first data volume, and second data packets or messages whose sender is the second network user and whose receiver is the first network user defining the second data volume. For example, system knowledge specifies that a ratio of the first data volume to the second data volume between a first control unit ECU_A and a second control unit ECU_B should be 3:1. If it is now detected that this ratio is 10:1 within a certain time period, the deviation in the example is 7. If the allowable deviation is 4, for example, in this example the deviation would exceed this allowable deviation. In this case, an anomaly would thus be detected. If the allowable deviation is 8, for example, in this case no anomaly would be detected.

During the anomaly detection, a distinction is preferably made between various system states in which the vehicle is in, in particular between the system states "ignition on," "engine idling," "forward travel," "reverse travel," or "vehicle diagnostics on," a system state of the vehicle being determined, and the expected property being determined as a function of the system state. This distinction is particularly meaningful when, although the behavior of the network traffic may differ significantly in various system states, the network traffic in the same system state is uniform in a sense. The network traffic may then be modeled via its important properties. For example, a different allowable deviation is predefined for different system states.

In one aspect of the present invention, a measure for the deviation is determined at synchronous or asynchronous points in time, and the measure for the deviation is compared to a threshold value that defines the allowable deviation. The measure may be the above-described deviation of the ratio from the ratio of the data volumes that is expected from system knowledge. In this case, the threshold value may numerically indicate the allowable deviation. Comparisons at synchronous points in time may be made, for example, at regular time intervals. Asynchronous monitoring may be carried out, for example, after a fixed number of data packets is analyzed.

In one aspect of the present invention, the model defines the expected property as a function of a predefined sequence of a network protocol used in the communications network. Instead of or in addition to the system state, a different treatment for different protocols is thus possible. Higher deviations may thus be tolerated that are less critical in terms of the operational reliability of the vehicle than in protocols that are safety-relevant in this regard.

It is preferably provided that the model defines a measure for the data traffic that is aggregated in particular by a counter or "leaky bucket" mechanism, in particular per most recent time units and/or per communication user, in particular a number of the transferred data packets, an average size of the transferred data packets, an average number of the network connections, an average data volume per network connection, a number of the terminated network connections, a response time, or a ratio between sent and received data. These measures may be computed for various dimensions. Two examples of usable dimensions are per x most recent time units and/or per communication user. For the counting per time units, the use of a counter is an advantageous mechanism for determining when a measure is too high, it being counted, for example, how often a certain event occurs. Another mechanism is the leaky bucket mechanism, which uses a leaky bucket counter. This counter has the advantage that in contrast to other types of counters, a temporary increase in the measure over a certain time period is tolerated. Thus, when a network activity is used as the measure, an anomaly due to, for example, a temporary increase in network activity is not immediately detected.

It is preferably provided that the deviation is determined as a function of information concerning a network protocol used by a network user, in particular as a function of one of the network protocols Ethernet, IPv4/IPv6, TCP/UDP, SOME/IP, DDS, DoIP, and AVB. This distinction allows protocol-specific differences to be taken into account.

In accordance with an example embodiment of the present invention, a device for anomaly detection in a communications network provides that the device includes a port and a processing unit that are designed to carry out the method.

Further advantageous specific embodiments result from the following description and the figures.

DETAILED DESCRIPTION OF EXAMPLE EMBODIMENTS

Figure 1:
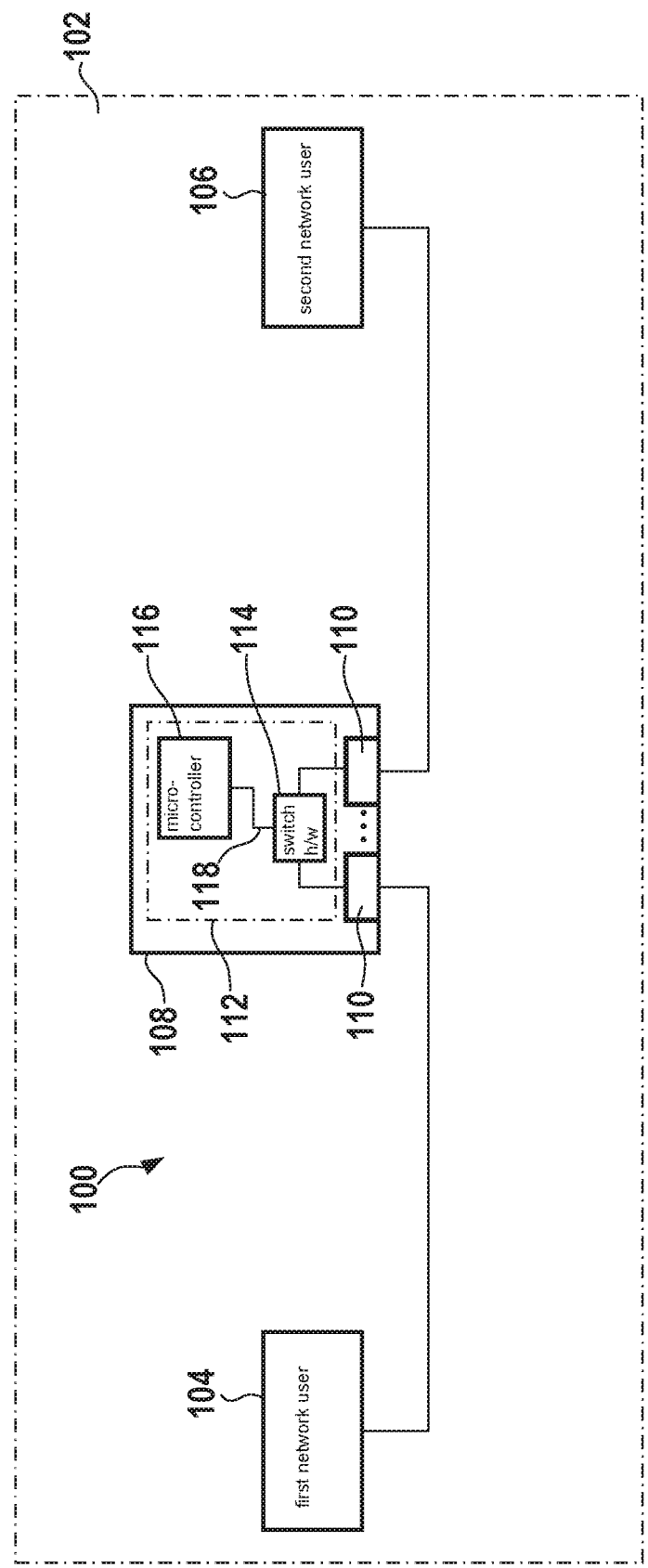
FIG. 1 shows a schematic illustration of a communications network in a vehicle in accordance with an example embodiment of the present invention.

FIG. 1 schematically represents a communications network 100 in a vehicle 102. Communications network 100 includes a first network user 104, a second network user 106, and a connecting element 108. Connecting element 108 is, for example, a switch, in particular an automotive Ethernet switch. Connecting element 108 includes at least one port 110, in particular a hardware port. This port is also referred to as a hardware switch port. FIG. 1 schematically illustrates two ports 110; more or fewer ports 110 may also be provided. Connecting element 108 is designed to process incoming messages at one of ports 110. These messages may be output or discarded at this port or some other port 110. Connecting element 108 includes a processing unit 112 that is designed to process the messages. Processing device 112 may be implemented as part of switch hardware 114. Processing device 112 may be situated in a distributed manner, in particular on a portion of switch hardware 114 and a microcontroller 116 that is connected or connectable to this portion of switch hardware 114 via a data line 118.

Figure 2:
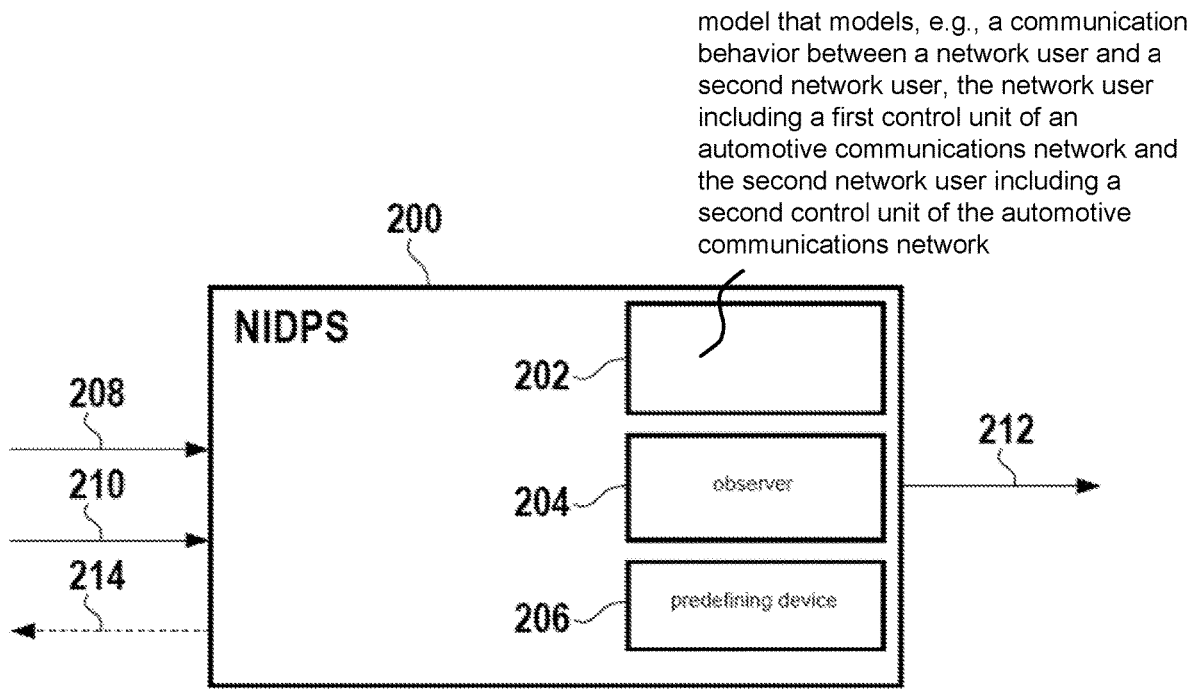
FIG. 2 shows a schematic illustration of an anomaly detection system for the communications network in accordance with an example embodiment of the present invention.

A device, described in greater detail below, for anomaly detection in accordance with the present invention includes port 110 and processing unit 112. The device represents at least a portion of an anomaly detection system 200 for communications network 100 schematically illustrated in FIG. 2. This device is referred to below as a Network Intrusion Detection and Prevention System (NIDPS).

NIDPS 200 includes a model 202 for expected network behavior. In the example, model 202 models the expected network behavior for each port 110, for each Ethernet port in the example. The network behavior between two network users, in particular first network user 104 and second network user 106, may also be modeled. Model 202 in the example is based on system knowledge about communications network 100. The system knowledge concerns, for example, a topology of communications network 100 or information concerning the data exchange between network users in communications network 100.

NIDPS 200 includes an observer 204 for observed network behavior. In the example, observer 204 observes the expected network behavior for each port 110, for each Ethernet port in the example. The network behavior between two network users, in particular first network user 104 and second network user 106, may also be observed.

NIDPS 200 includes a predefining device 206, which in the example is designed to predefine an allowable deviation. The allowable deviation may be static or may be predefined as a function of a system state. Different allowable deviations may be predefined for different network users or different network behavior.

NIDPS 200 includes a first input 208 for a system state. NIDPS 200 at first input 208 may also be designed to receive information concerning the system state and to determine the system state as a function of this information. In this case it may be provided that predefining device 206 determines and/or predefines the allowable deviation as a function of the system state.

NIDPS 200 includes a second input 210 for data packets. In the example, the data packets are transmitted from port 110 to second input 210.

NIDPS 200 includes a first output 212 for information concerning a result of the anomaly detection. In the example, information concerning an anomaly, i.e., information about the type of anomaly or a measure for its severity, is output. Additional information or information for triggering a response to the anomaly may also be output. In addition, an output of a state of the anomaly detection may be provided that indicates whether or not an anomaly is present.

NIDPS 200 may include a second output 214 for data packets. NIDPS 200 may be designed to output the data packets at second output 214 for relaying in communications network 100. NIDPS 200 may be designed to output a data packet for relaying in communications network 100 only when no anomaly has been detected, and the data packet is otherwise to be discarded.

NIDPS 200 may be designed to analyze a data packet based on the content of the data packet, and to relay or discard the data packet as a function of the result of the check. NIDPS 200 may be designed to output, instead of the data packet itself, a signal at the second output that enables the relaying of the data packet or triggers the discarding of the data packet.

Figure 3:
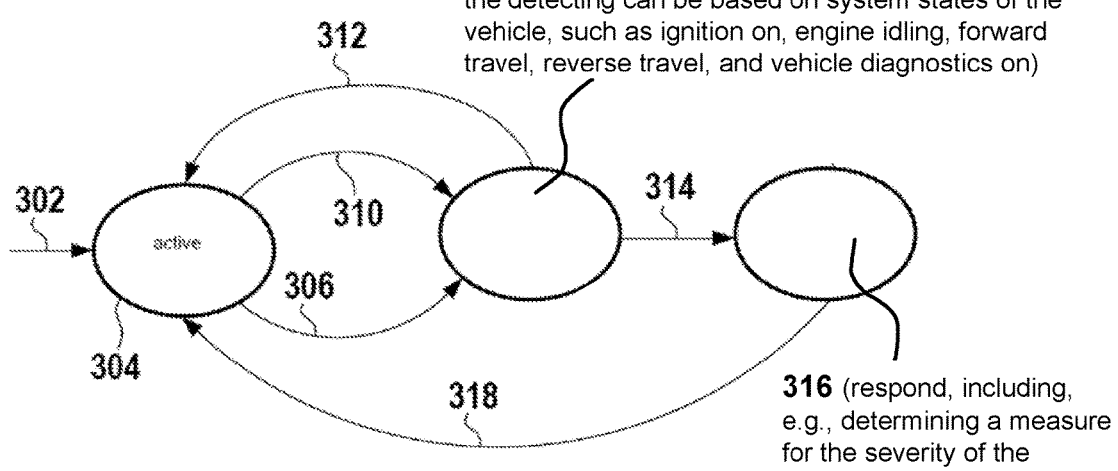
FIG. 3 shows steps in a method for anomaly detection in the communications network in accordance with an example embodiment of the present invention.

A method for anomaly detection in accordance with an example embodiment of the present invention is described below with reference to FIG. 3. The method begins, for example, when a signal 302 places the NIDPS in an "active" state 304. Messages at port 110 of communications network 100 are observed in "active" state 304. For example, data packets at port 110 that are associated with the messages and/or that at least partially or completely include same are received and/or observed. In the example, data packets according to the automotive Ethernet standard are observed as messages.

In a first aspect, a change is made into a "compute" state 308 at synchronous or asynchronous points in time in a step 306.

In a second aspect, when an Xth message is received a change is made into "compute" state 308 in a step 310. In one example, X denotes an integer number of messages. For example, a counter detects how many messages have been observed since the last change into "compute" state 308, and a change is made into "compute" state 308 after the receipt of at least two messages since this change.

In the example, the number of messages observed prior to the change is $1<X$, and in particular may be $X=2$, $X=5$, or $X=10$. It may be provided to observe only the messages that are received from a certain network user or addressed to a certain network user. It is also possible to observe only messages of a certain message type, or messages exchanged using a certain message protocol, for determining number X.

A property of a communication behavior of a network user or multiple network users is determined in "compute" state 308 as a function of at least two messages. A deviation of the property from an expected property is subsequently determined.

The expected property defines a communication behavior of at least one network user as a function of an in particular static network architecture of communications network 100.

The expected property is determined, for example, based on model 202 which models the communication behavior of network users.

In one aspect of the present invention, model 202 is defined as a function of information concerning a static portion of communications network 100. In particular, model 202 may specify a static network architecture of the vehicle. In this case, the expected property is defined as a function of information concerning the static portion of communications network 100, in particular the static network architecture.

In one aspect of the present invention, model 202 defines the expected property as a function of a predefined sequence of a network protocol used in communications network 100.

For example, a measure for the deviation is determined, and the measure for the deviation is compared to a threshold value which defines the allowable deviation.

For example, in the first aspect the measure is determined for the deviation for the synchronous or asynchronous points in time, and the measure for the deviation is compared to the threshold value which defines the allowable deviation.

For example, in the second aspect, after receipt of the Xth message the measure for the deviation is compared to the threshold value which defines the allowable deviation.

In the example illustrated in FIG. 1, first data packets or messages whose sender is first network user 104 and whose receiver is second network user 106 define a first data volume. Second data packets or messages whose sender is second network user 106 and whose receiver is first network user 104 define a second data volume.

In this example, the expected property defines a ratio between the first data volume and the second data volume. The ratio is determined in particular as a function of data that are exchanged in a defined time period. Information concerning the ratio is determined, for example, by observed exchanged data in communications network 100.

For example, one of the network protocols Ethernet, IPv4/IPv6, TCP/UDP, SOME/IP, DDS, DoIP, and AVB is used. Number X and the data volumes are determined, for example, as a function of messages that are transferred according to one of these network protocols. In this case, the allowable deviation of the ratio, for example, is determined as a function of information concerning the network protocol used for this purpose.

Model 202 uses, for example, a counter or leaky bucket mechanism that aggregates a measure for the data traffic. For example, aggregation is carried out per most recent time units and/or per communication user.

It may be provided for data traffic in communications network 100 to aggregate a number of the transferred data packets, an average size of the transferred data packets, an average number of the network connections, an average data volume per network connection, a number of the terminated network connections, a response time, or a ratio between sent and received data, and to set a ratio for a variable that is modeled for this purpose.

The presence of an anomaly is detected when the deviation differs from the allowable deviation. The allowable deviation is determined with the aid of model 202 as a function of the expected property.

If no anomaly is detected, a change is made from "compute" state 308 into "active" state 304 in a step 312.

If an anomaly is detected, a change is made from "compute" state 308 into "respond" state 316 in a step 314.

A response to a detected anomaly is determined in "respond" state 316. In one aspect, a measure for the severity of the anomaly is determined, and the response is determined as a function of the severity of the anomaly. For example, the measure for the severity of the anomaly is determined as a function of the property of the communication behavior of the network user or the network users, the expected property, and/or the deviation.

In the example, the response is selected from a plurality of defined responses as a function of the severity of the anomaly.

The response may include a report to a central unit, discarding of a data packet of in particular one of the messages, and/or a transition of communications network 100 into a secure state.

The response is triggered, for example, by an output at first output 212 of the NIDPS.

It may be provided that during the anomaly detection, a distinction is made between various system states in which the vehicle is in. For example, a distinction is made between the following system states: "ignition on," "engine idling," "forward travel," "reverse travel," or "vehicle diagnostics on." The system states are provided via first input 208, for example. The allowable deviation is predefined by predefining device 206 as a function of the system states. A system state of the vehicle may also be determined as a function of the information at first input 208. In this aspect, the expected property is determined as a function of the system state. For example, with respect to the state "vehicle diagnostics on," a smaller deviation is allowed when the vehicle is determined to be in one of the states "ignition on," "engine idling," "forward travel," "reverse travel."

After the response, a change is made into "active" state 304 in a step 318.

The method ends, for example, based on a corresponding signal.

What is claimed is:

1. A method for anomaly detection in an automotive communications network of a vehicle, the method comprising the following steps:
   observing at least two messages at a port of the automotive communications network;
   determining a property of a communication behavior of a network user as a function of the at least two messages, the network user including a first control unit of the automotive communications network;
   determining a deviation of the property from an expected property, wherein the expected property is determined based on a model that models a communication behavior between the network user and a second network user, the second network user including a second control unit of the automotive communications network, the expected property being a function of a static network architecture of the automotive communications network including the first control unit and the second control unit; and
   detecting a presence of an anomaly based on the deviation differing from an allowable deviation,
   wherein during the anomaly detection, a distinction is made between various system states in which the vehicle can potentially be in, the system states including (i) ignition on, (ii) engine idling, (iii) forward travel, (iv) reverse travel, and (v) vehicle diagnostics on; a system state of the vehicle being determined, and at least one of the expected property or the allowable deviation being determined as a function of the determined system state.

2. The method as recited in claim 1, wherein a measure for the severity of the anomaly is determined as a function of at least one of: (i) the property of the communication behavior of the network user, (ii) the expected property, or (iii) the deviation, a response being determined as a function of the severity of the anomaly.

3. The method as recited in claim 2, wherein the response is selected from a plurality of defined responses as a function of the severity of the anomaly.

4. The method as recited in claim 2, wherein the response includes at least one of: a report to a central unit, discarding of a data packet of one of the messages, or a transition of the communications network into a secure state.

5. The method as recited in claim 1, wherein the model is defined as a function of information concerning the static network architecture of the vehicle, the expected property being defined as a function of information concerning the static portion of the static network architecture.

6. The method as recited in claim 1, wherein the expected property defines a ratio between a first data volume and a second data volume of data that are exchanged in a defined time period, first data packets or messages whose sender is the network user and whose receiver is the second network user defining the first data volume, and second data packets or messages whose sender is the second network user and whose receiver is the network user defining the second data volume.

7. The method as recited in claim 1, wherein a measure for the deviation is determined at synchronous or asynchronous points in time, and the measure for the deviation is compared to a threshold value that defines the allowable deviation.

8. The method as recited in claim 1, wherein the model defines the expected property as a function of a predefined sequence of a network protocol used in the communications network.

9. The method as recited in claim 1, wherein the model defines a measure for data traffic that is aggregated by a counter or leaky bucket mechanism, per most recent time units and/or per communication user, the measure being a number of transferred data packets, or an average size of the transferred data packets, or an average number of the network connections, or an average data volume per network connection, or a number of the terminated network connections, or a response time, or a ratio between sent and received data.

10. The method as recited in claim 1, wherein the deviation is determined as a function of information concerning a network protocol used by a network user, the network protocol being at least one of: Ethernet, IPv4/IPv6, TCP/UDP, SOME/IP, DDS, DoIP, or AVB.

11. A device for anomaly detection in an automotive communications network of a vehicle, the device comprising:
  a port; and
  a processing unit configured to:
    observe at least two messages at the port;
    determine a property of a communication behavior of a network user as a function of the at least two messages, the network user including a first control unit of the automotive communications network;
    determine a deviation of the property from an expected property, wherein the expected property is determined based on a model that models a communication behavior between the network user and a second network user, the second network user including a second control unit of the automotive communications network, the expected property being a function of a static network architecture of the automotive communications network including the first control unit and the second control unit; and
    detect a presence of an anomaly based on the deviation differing from an allowable deviation,
    wherein during the anomaly detection, a distinction is made between various system states in which the vehicle can potentially be in, the system states including (i) ignition on, (ii) engine idling, (iii) forward travel, (iv) reverse travel, and (v) vehicle diagnostics on; a system state of the vehicle being determined, and at least one of the expected property or the allowable deviation being determined as a function of the determined system state.

12. A non-transitory computer-readable memory medium on which is stored a computer program for anomaly detection in an automotive communications network of a vehicle, the computer program, when executed by a computer, causing the computer to perform the following steps:
  observing at least two messages at a port of the automotive communications network;
  determining a property of a communication behavior of a network user as a function of the at least two messages, the network user including a first control unit of the automotive communications network;
  determining a deviation of the property from an expected property, wherein the expected property is determined based on a model that models a communication behavior between the network user and a second network user, the second network user including a second control unit of the automotive communications network, the expected property being a function of a static network architecture of the automotive communications network including the first control unit and the second control unit; and
  detecting a presence of an anomaly based on the deviation differing from an allowable deviation,
  wherein during the anomaly detection, a distinction is made between various system states in which the vehicle can potentially be in, the system states including (i) ignition on, (ii) engine idling, (iii) forward travel, (iv) reverse travel, and (v) vehicle diagnostics on; a system state of the vehicle being determined, and at least one of the expected property or the allowable deviation being determined as a function of the determined system state.

13. The non-transitory computer-readable medium as recited in claim 12, wherein the expected property defines a ratio between a first data volume and a second data volume of data that are exchanged in a defined time period, first data packets or messages whose sender is the network user and whose receiver is the second network user defining the first data volume, and second data packets or messages whose sender is the second network user and whose receiver is the network user defining the second data volume.

14. The device as recited in claim 11, wherein the expected property defines a ratio between a first data volume and a second data volume of data that are exchanged in a defined time period, first data packets or messages whose sender is the network user and whose receiver is the second network user defining the first data volume, and second data packets or messages whose sender is the second network user and whose receiver is the network user defining the second data volume.

* * * * *